US008826032B1

(12) United States Patent
Yahalom et al.

(10) Patent No.: US 8,826,032 B1
(45) Date of Patent: Sep. 2, 2014

(54) SYSTEMS AND METHODS FOR NETWORK CHANGE DISCOVERY AND HOST NAME RESOLUTION IN STORAGE NETWORK ENVIRONMENTS

(75) Inventors: Raphael Yahalom, Needham, MA (US); Assaf Levy, Brookline, MA (US); Gadi Oren, Cambridge, MA (US)

(73) Assignee: NetApp, Inc., Sunnyvale, CA (US)

( * ) Notice: Subject to any disclaimer, the term of this patent is extended or adjusted under 35 U.S.C. 154(b) by 1422 days.

(21) Appl. No.: 11/965,392

(22) Filed: Dec. 27, 2007

Related U.S. Application Data

(60) Provisional application No. 60/877,230, filed on Dec. 27, 2006.

(51) Int. Cl.
*G06F 11/30* (2006.01)

(52) U.S. Cl.
USPC ............................................. 713/187; 726/2

(58) Field of Classification Search
CPC ........ G06F 15/177; G06F 11/006; G06F 9/46
USPC .............................................. 713/187; 726/2
See application file for complete search history.

(56) References Cited

U.S. PATENT DOCUMENTS

| 5,043,866 | A | 8/1991 | Myre, Jr. et al. |
| 5,280,611 | A | 1/1994 | Mohan et al. |
| 5,327,556 | A | 7/1994 | Mohan et al. |
| 5,381,545 | A | 1/1995 | Baker et al. |
| 5,586,250 | A | 12/1996 | Carbonneau et al. |
| 5,684,967 | A | 11/1997 | McKenna et al. |
| 5,774,377 | A | 6/1998 | Eidson et al. |
| 5,825,772 | A | 10/1998 | Dobbins et al. |
| 5,940,819 | A | 8/1999 | Beavin et al. |
| 6,014,673 | A | 1/2000 | Davis et al. |
| 6,223,176 | B1 | 4/2001 | Ricard et al. |
| 6,233,240 | B1 | 5/2001 | Barbas et al. |

(Continued)

FOREIGN PATENT DOCUMENTS

| WO | WO-01/82077 | 11/2001 |
| WO | WO-02/088947 | 11/2002 |
| WO | WO-03/054711 | 7/2003 |
| WO | WO-04/111765 | 12/2004 |

OTHER PUBLICATIONS

"Storage Management and the Continued Importance of CIM," White Paper, Data Mobility Group (Jan. 2004).

(Continued)

*Primary Examiner* — Harunur Rashid
(74) *Attorney, Agent, or Firm* — LeClairRyan, A Professional Corporation

(57) ABSTRACT

The systems and methods described herein include processes for efficiently detecting relevant state changes in storage network environments and for resolving the name of hosts in storage networks. A subset of states for each component in the storage network is tracked, state information consisting of the values of the selected states with an associated timestamp and a component identifier (ID) for the storage network components is periodically received, a hash function value of the received state using a pre-selected hash function is computed, the most-recent locally-stored hash function value associated with that component ID is retrieved, and in case the hash function value is different from the most-recently locally-stored value, the new hash function value and the timestamp associated with that new value and component ID are stored and this state information is forwarded to a global analyzer service.

8 Claims, 4 Drawing Sheets

(56) References Cited

U.S. PATENT DOCUMENTS

| | | |
|---|---|---|
| 6,240,463 B1 | 5/2001 | Benmohamed et al. |
| 6,327,598 B1 | 12/2001 | Kelley et al. |
| 6,347,335 B1 | 2/2002 | Shagam et al. |
| 6,434,626 B1 | 8/2002 | Prakash et al. |
| 6,636,981 B1 | 10/2003 | Barnett et al. |
| 6,691,169 B1 | 2/2004 | D'Souza |
| 6,751,228 B1 | 6/2004 | Okamura |
| 6,792,503 B2 | 9/2004 | Yagi et al. |
| 6,795,399 B1 | 9/2004 | Benmohamed et al. |
| 6,801,949 B1 | 10/2004 | Bruck et al. |
| 6,816,927 B2 | 11/2004 | Bouchet |
| 6,904,143 B1 | 6/2005 | Peterson et al. |
| 6,909,700 B1 | 6/2005 | Benmohamed et al. |
| 6,985,937 B1 | 1/2006 | Keshav et al. |
| 7,051,029 B1 | 5/2006 | Fayyad et al. |
| 7,058,702 B2 | 6/2006 | Hogan |
| 7,062,559 B2 | 6/2006 | Yoshimura et al. |
| 7,069,480 B1 | 6/2006 | Lovy et al. |
| 7,103,653 B2 | 9/2006 | Iwatani |
| 7,103,712 B2 | 9/2006 | Mizuno et al. |
| 7,120,654 B2 | 10/2006 | Bromley |
| 7,127,633 B1 | 10/2006 | Olson et al. |
| 7,149,886 B2 | 12/2006 | Fujibayashi et al. |
| 7,194,538 B1 | 3/2007 | Rabe et al. |
| 7,260,628 B2 | 8/2007 | Yamamoto et al. |
| 7,376,937 B1 | 5/2008 | Srivastava et al. |
| 7,380,239 B1 | 5/2008 | Srivastava et al. |
| 7,403,987 B1 * | 7/2008 | Marinelli et al. ............. 709/223 |
| 7,512,954 B2 | 3/2009 | Srivastava et al. |
| 7,546,333 B2 | 6/2009 | Alon et al. |
| 7,617,320 B2 | 11/2009 | Alon et al. |
| 2001/0047482 A1 | 11/2001 | Harris et al. |
| 2002/0145981 A1 | 10/2002 | Klinker et al. |
| 2003/0005119 A1 | 1/2003 | Mercier et al. |
| 2003/0018619 A1 | 1/2003 | Bae et al. |
| 2003/0033346 A1 | 2/2003 | Carlson et al. |
| 2003/0033398 A1 | 2/2003 | Carlson et al. |
| 2003/0055932 A1 | 3/2003 | Brisse |
| 2003/0131077 A1 | 7/2003 | Hogan |
| 2003/0191992 A1 | 10/2003 | Kaminsky et al. |
| 2003/0208589 A1 * | 11/2003 | Yamamoto ................. 709/224 |
| 2003/0237017 A1 | 12/2003 | Jibbe |
| 2004/0010787 A1 | 1/2004 | Traut et al. |
| 2004/0019833 A1 | 1/2004 | Riedl |
| 2004/0030768 A1 | 2/2004 | Krishnamoorthy et al. |
| 2004/0075680 A1 | 4/2004 | Grace et al. |
| 2004/0205089 A1 | 10/2004 | Alon et al. |
| 2004/0215749 A1 | 10/2004 | Tsao |
| 2004/0243699 A1 | 12/2004 | Koclanes et al. |
| 2005/0010682 A1 | 1/2005 | Amir et al. |
| 2005/0033757 A1 | 2/2005 | Greenblatt et al. |
| 2005/0044088 A1 | 2/2005 | Lindsay et al. |
| 2005/0097471 A1 | 5/2005 | Faraday et al. |
| 2005/0114403 A1 | 5/2005 | Atchison |
| 2005/0160431 A1 | 7/2005 | Srivastava et al. |
| 2005/0256961 A1 | 11/2005 | Alon et al. |
| 2005/0262233 A1 | 11/2005 | Alon et al. |
| 2006/0004830 A1 | 1/2006 | Lora et al. |
| 2006/0106938 A1 * | 5/2006 | Dini et al. .................. 709/228 |
| 2006/0143492 A1 | 6/2006 | LeDuc et al. |
| 2006/0161883 A1 | 7/2006 | Lubrecht et al. |
| 2006/0161884 A1 | 7/2006 | Lubrecht et al. |
| 2006/0218366 A1 | 9/2006 | Fukuda et al. |
| 2007/0088763 A1 | 4/2007 | Yahalom et al. |
| 2007/0094378 A1 | 4/2007 | Baldwin et al. |
| 2007/0112883 A1 | 5/2007 | Asano et al. |
| 2007/0169177 A1 * | 7/2007 | MacKenzie et al. ............. 726/3 |
| 2007/0179985 A1 * | 8/2007 | Knowles et al. ............. 707/200 |
| 2007/0192329 A1 | 8/2007 | Croft et al. |
| 2007/0198722 A1 | 8/2007 | Kottomtharayil et al. |
| 2007/0208920 A1 * | 9/2007 | Tevis ........................... 711/170 |
| 2008/0109822 A1 * | 5/2008 | Chokshi et al. ............... 719/318 |
| 2008/0155208 A1 | 6/2008 | Hiltgen et al. |
| 2008/0155223 A1 | 6/2008 | Hiltgen et al. |
| 2008/0189468 A1 | 8/2008 | Schmidt et al. |
| 2008/0189700 A1 | 8/2008 | Schmidt et al. |
| 2009/0172666 A1 | 7/2009 | Yahalom et al. |
| 2009/0313367 A1 | 12/2009 | Alon et al. |

OTHER PUBLICATIONS

"Softek SANView: Simplify the discovery and management of multi-vendor SANs," Fujitsu Softek (May 2002).
"Information Lifecycle Management: An Automated Approach," Technical White Paper, EMC2 (Dec. 8, 2003).
"Kasten Chase Unveils Advanced Security Architecture," GRIDtoday, v.1, n. 18; www.gridtoday.com/02/101/100546.html, (Oct. 14, 2002), printed from Internet on Oct. 16, 2003.
"Assurency: Comprehensive, Persistent Security for Storage Area Networks," Kasten Chase (2002).
"Radiant Data Server Technology Overview," White Paper, Radiant Data Corporation (2003).
Lee et al., "Storage Network Management Software—The Critical Enabler of Maximum ROI," Storage Consulting Group (Dec. 16, 2002).
U.S. Appl. No. 12/006,125, filed Dec. 31, 2007.
U.S. Appl. No. 12/080,946, filed Apr. 7, 2008.
U.S. Appl. No. 12/283,163, filed Sep. 9, 2008.

* cited by examiner

US 8,826,032 B1

SYSTEMS AND METHODS FOR NETWORK CHANGE DISCOVERY AND HOST NAME RESOLUTION IN STORAGE NETWORK ENVIRONMENTS

CROSS-REFERENCE TO RELATED PATENT APPLICATIONS

This application claims the benefit under 35 U.S.C. §119(e) of U.S. Provisional Application No. 60/877,230 filed Dec. 27, 2006, which is hereby incorporated herein by reference in its entirety.

FIELD OF THE INVENTION

The systems and methods generally relate to efficient discovery of changes in storage network environments and to resolution of host names in a storage network environment.

BACKGROUND

Storage area networks (SANs) or storage network environments are dedicated networks for enabling multiple applications on hosts access to data stored in consolidated shared storage infrastructures. In storage network environments, it may be important to detect changes and determine the implications of these changes on the storage service levels provided to applications and hosts. Enterprises are deploying increasingly large-scale SANs in order to gain economies-of-scale business benefits, and are performing and planning massive business-critical migration processes to these new environments.

Enterprise SANs are increasingly supporting most of the business critical applications in enterprises. These SAN are increasingly large and complex. A typical SAN environment in a Fortune 500 company may contain hundreds or thousands of servers and tens or hundreds of switches and storage devices of different types. Furthermore these SAN environments are undergoing a large amount of change and growth.

This large size and rate of growth of SANs leads to huge added complexity. The number of components and links which may be associated with the data transfer from each given application and one or more of its data units may increase exponentially with the size of the SAN. This complexity, which is compounded by the heterogeneity of the different SAN devices, leads to high risk and inefficiency. Changes to the SAN (which need to happen often due to the natural growth of the SAN) take a long time to complete by groups of SAN managers, and are error-prone. For example, in many existing enterprises a routine change (such as adding a new server to a SAN) may take 1-2 weeks to complete, and a high percentage of these change process (sometime as high as 30-40%) include at least one error along the way. It is estimated that around 80% of enterprise SAN outage events are a result of some infrastructure change-related event.

The end-points in SAN flows generally have a relatively strong exclusive access relationship. That is, each application on a SAN-connected host typically requires access, and often exclusive access, only to some specific SAN data objects (LUNs). Consequently, in storage area networks each source end point, i.e., the application on a host, will typically need to interact only, and often exclusively, with a specific, small number of target end points, e.g., the LUNs on the network storage devices.

However, access relationships and their related access characteristics actually need to be realized by setting up multiple underlying devices of different types. These underlying operations include multiple physical and logical basic set up actions which need to be set up in different locations and device types and with mutual consistency.

An access path or a logical access path will encompass a logical channel between a given application and a given data object, e.g. LUN, along which data may flow. In other words, a logical access path is typically, although not exclusively, a sequence of components starting with a specific application on a specific server via, for example, an HBA, and a sequence of one or more switches and physical links leading to a storage controller and a storage device containing a data object e.g. a LUN. The logical or configuration state of each component along the way in that sequence, for example, the HBA, the storage controller, or the switches, is set such as to not disable data flow between that specific application and that specific data object along that specific sequence.

Changes within a storage network environment are difficult to detect. For instance, a failure of a storage area network switch may eliminate an access path between two components on the network thereby disrupting the corresponding data flow. Because of the potentially very large number of components in the storage network environment, very frequent storage network environment changes, and large amount of local state information of each component, and because of the complexity of performing the correlation of the information and analysis of the end-to-end access paths and attributes, any change detection approach needs to be very efficient to perform the task of detecting changes effectively in realistic environments.

Currently, there are no adequate technological solutions to assist SAN administrators in discovering relevant changes in SAN state, particularly in relation to application-data requirements. Most, if not all, current solutions rely on host agents in hosts within the SAN to collect a partial set of information. Using this partial set of information, SAN administrators then rely on manual methods, spreadsheet based information, and trial and error. Furthermore, host agents are very difficult to manage and/or maintain, and are widely considered undesirable for large SANs in which scalability may be important.

Therefore, there is a need for a solution to the problem of efficiently discovering state change events in components in storage area network environments, mapping these changes to access paths and storage service levels for applications and/or hosts, and mapping between host identifiers in the storage environment to the identifiers of those hosts in other enterprise data center environments.

SUMMARY

The systems and methods described herein include processes for efficiently detecting relevant state changes in storage network environments by selecting a subset of states or a subset of state variables for each component type to be tracked, periodically receiving state information consisting of the values of the selected states with an associated timestamp and a component identifier (ID) for the storage network components, computing a function value of the received states using a pre-selected hash function, looking up the most-recent locally-stored hash function value associated with that component ID, and in case the hash function value is different from the most-recently locally-stored value, storing the new hash function value and the timestamp associated with that new value and component ID, and forwarding to a Global Analyzer the component ID, associated timestamp, and component state. In certain practice, the states of the component may include the configuration state and/or the internal execution state. For example, a state of a switch may include a list of zones in the storage network environment and the member names for each of these zones. In certain practice, a subset of states e.g. internal execution states and/or configuration states are selected. For example, the process may select one or more of the elements in the configuration state.

More particularly, the systems and methods described herein include, among other things, processes for detecting state changes in storage network environments. In one particular practice, these processes select a subset of the states or a subset of state variables for the components in the storage network environment. The subset of state variables may be one or more of the states of any of the components in the storage network environment. The process may periodically receive the states, associated timestamps, and component identifiers, from components in the storage network environment. The process may compute hash function values of a received state or states using a pre-selected hash function. A most-recently locally-stored hash function value associated with the component identifier may be compared to a most-recently received state hash function value. If the hash function values are different, the process may locally store the most-recently received hash function value, the associated timestamp, and the component identifier. The process may then send the component identifier, the associated timestamp, and the state hash function value to a global analyzer.

Selecting the subset of states may comprise choosing variables which impact a level of storage service provided to an application such that a fluctuation rate of the value for each state variable is lower than a pre-selected fluctuation threshold.

The process may periodically receive values of the component's selected state variables as a result of a response to a polling request, as the result of an unsolicited update, or through some other technique. Optionally, the process may compute hash functions for the states it received, and send only these values to the global analyzer service if the corresponding hash function values differ from the corresponding previously locally-stored and computed values. If the values differ, the process may send to a global analyzer service the component identifier, the associated timestamp, and the state value if the compared values are not equal. Alternatively, the process may not send to the global analyzer service the component identifier, the associated timestamp, and the state value if the most-recently locally-stored associated timestamp and the most-recently received associated timestamp are equal.

In another aspect, there are set out herein systems for detecting state changes in storage network environments. In certain embodiments, such systems comprise a global analyzer for processing component identifiers, associated timestamps, and state values for states of components in the storage network environment, and component interaction modules connected to the global analyzer for computing and locally storing the component identifiers, the associated timestamps, and the state hash function values.

In another aspect, the systems and methods described herein provide processes for resolving the name of hosts in a storage network environment. Such processes may comprise deriving logical access paths in the storage network environment from storage network component information, and deriving a host candidate name for a host by parsing strings included in the states of storage network components located on access paths associated with the host. The processes may validate the host candidate name by submitting a query to a global name server and receiving confirmation from the global name server. The process may then store a mapping between the WWN associated with the host and the host candidate name if a name resolution confidence is above a name resolution threshold.

The process may optionally derive the logical access paths between two storage network components by collecting connectivity and configuration information from the network components and determining whether information can flow between the network components. Parsing strings may involve using a variety of parsing rules and regular expressions to extract candidate names from strings contained in the states of associated network components. The parsing rules may be further refined as well as regular expressions using naming convention information received from an external source. Optionally, the process may obtain user confirmation of the host candidate name.

The storage network component states used for parsing strings may include one of network zone names and LUN-masking information and deriving host candidate names may be achieved by parsing state information for storage network components on access paths associated with a host in the storage network environment. The global name server may include a Domain Name Server (DNS) database.

The process may optionally mark as unresolved the host candidate name if the name resolution confidence is below the name resolution threshold, and may optionally generate reports which include the mapping of host world-wide-names (WWNs) and validated host candidate names. Other variations and modification may also be practiced.

In another aspect, the systems and methods described herein include a system for automatically resolving the name of hosts in a storage network environment. The systems may include a storage management platform connected to storage network environment. The storage management platform derives logical access paths in the storage network environment from storage network component information, and derives a host candidate name for a host by parsing strings included in the states of storage network components located on access paths associated with the host. The system validates the host candidate name by submitting a query to a global name server and by receiving confirmation from the global name server. Optionally, the system may have a global name server connected to the storage management service, wherein the global name server includes a domain name server database.

BRIEF DESCRIPTION OF THE DRAWINGS

The above and other aspects and advantages of the embodiments will be apparent upon consideration of the following detailed description, taken in conjunction with the accompanying drawings, in which like reference characters refer to like parts throughout, which may not be drawn to scale, and in which.

DETAILED DESCRIPTION OF ILLUSTRATIVE EMBODIMENTS

The systems and methods, in various embodiments, provides, among other things, processes for efficient change discovery and host name resolution in storage network environments. The following detailed description of the embodiments refers to the accompanying drawings. Although the embodiments described below are described in reference to a Storage Area Network (SAN) or storage network environment, the various embodiments set out below are merely provided for the purposes of illustrating certain embodiments of these systems and methods and for describing examples of such systems and methods. It will be apparent to those of skill in the art that the systems and methods described herein may, in certain forms, be employed in other types of networks and other storage network environments.

A SAN or storage network environment is a network dedicated to enabling multiple applications on multiple hosts to access, i.e., read and write, data which is stored on multiple shared storage devices. A SAN consists of SAN devices, for example, different types of switches, which are interlinked, and is based on a number of possible transfer protocols such as Fiber Channel and iSCSI. Each server is connected to a SAN with one or more network cards, for example, an HBA. Application data is stored as data objects on storage devices in storage units e.g. LUNs.

Thus, a storage network environment comprises various types of components such as interconnected network components and storage device components. Such storage network environments enable applications that are executed on hosts to store and retrieve data which are stored on any of the storage devices in the environment.

Figure 1:
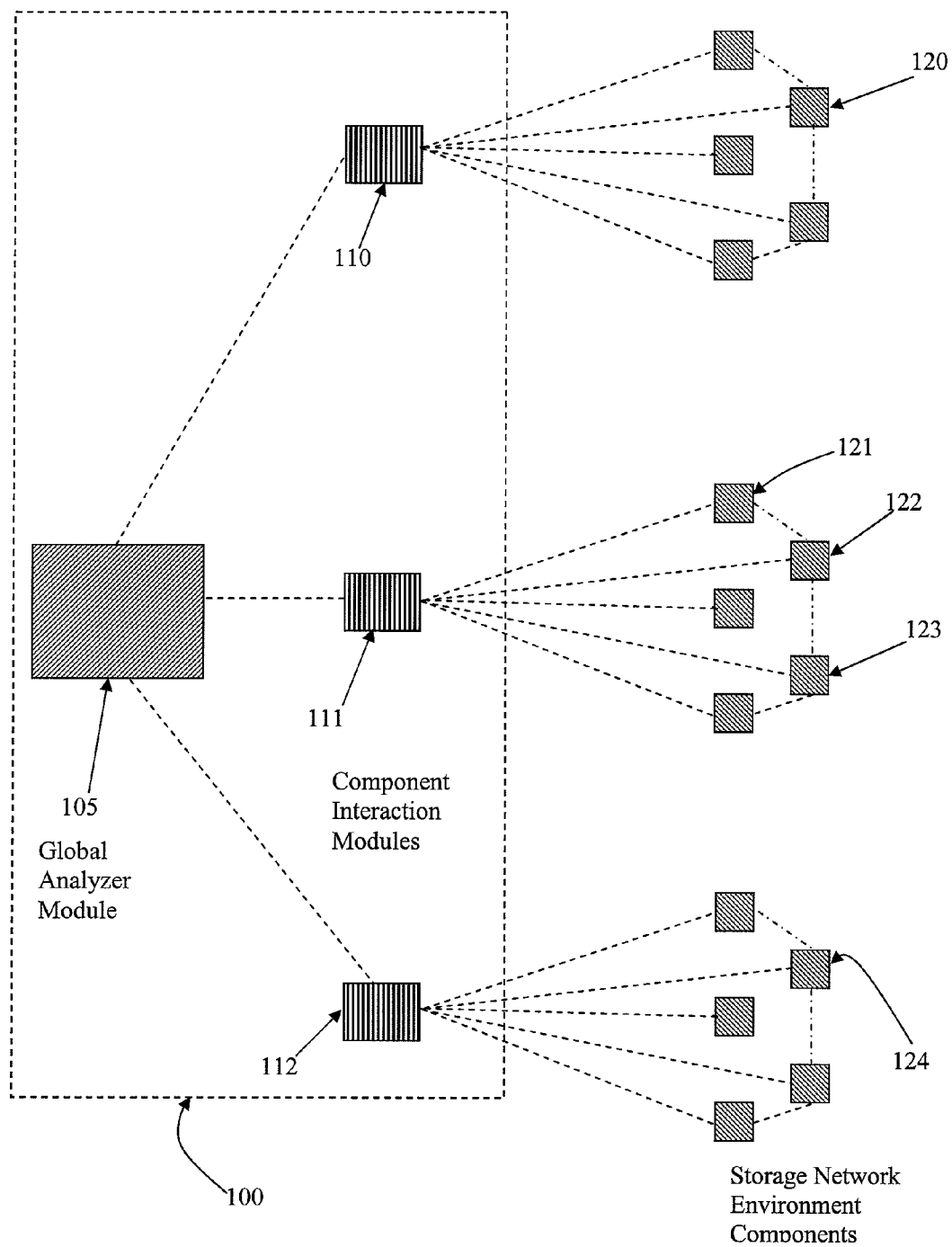
FIG. 1 shows an exemplary storage network environment which includes a storage management platform, and in which it may be desirable to detect changes using component interaction modules.

FIG. 1 depicts an exemplary storage area network environment. In this exemplary environment, component 121 may be a network switch to which a host is connected, and on which an application A is executed. Component 122 may also be a network switch which may be connected to 121 via one of its data ports, and which is also connected to storage device 123, on which data volumes are stored including one which is associated with application A.

In certain embodiments, each component in the storage network environment has a state, i.e., an internal execution state or configuration state, which may be configured to customize the function of that component. The internal execution state or configuration state of each component at each point of time contains values for various execution state variables (such as for example amount of data that flowed through a certain port in a recent interval) as well as configuration state variables, such as which ports are enabled, which other component is connected via each ports, what are the set transfer rates, which zones are defined for that component, which components are members of a particular zone, etc. Changes to these execution state variables occur as a result of data flow related activities, whereas changes to the configuration state variables occur as a result of planned or unplanned configuration actions. The internal state of each component, and the connectivity between the components, may change as a result of planned changes, unplanned changes, malicious attacks, random failures, etc. State changes encompass changes which may impact the level of storage network environment service provided to applications operating within that network environment.

In exemplary embodiments, a zone may be defined for switch 122, and members added or removed from that zone such that data flow may be enabled or disabled through switch 122 i.e. data flow may be enabled or disabled between application A and its data volume on storage device 123.

In preferred embodiments, the sequence of components between an application on a host and one of its data objects stored on a storage device, their types, attributes, state set up, and connectivity between them determine the level of storage service provided to that application. That level of service includes, for example, aspects of performance and availability for data flow. An access path between an application on a host and a data object on a storage device may be a sequence of components as described above which are set to enable information flow between the application flow on the host and the data object on the storage device. Attributes associated with each such end-to-end access path determine the level of storage service provided to that application.

In exemplary embodiments, with appropriate state configurations on storage network components 121, 122, and 123, these components may form an access path between A and its volume on data storage device 123. The individual characteristics of components 121, 122, and 123, and of the links between them determines the end-to-end performance attribute of that access path. The existence of an independent route by which data may flow from A to the data volume on data storage device 123 determines the level of end-to-end redundancy and so the end-to-end availability attribute of that access path.

In certain embodiments, to discover all the access paths in the storage network environment, compute their end-to-end attributes, and establish that they are consistent with the set policy requirements, information needs to be obtained from the different components regarding the types, state, and connectivity. These aspects are described in commonly-assigned U.S. patent application Ser. Nos. 10/693,632 and 11/529,748, the contents of which are hereby incorporated herein in their entirety.

In certain embodiments, the information described above is correlated and analyzed by mapping to an abstract graph-model representation in which each node represent a component and links between nodes represent connectivity between components and internal or configuration state information in each component. Data flow between 2 nodes in the graph is deemed possible if and only if there exists an access path between the 2 nodes in the model representation, and the attributes of that data flow are determined by the attributes of the different nodes and links associated with that path. If an access path exists between 2 nodes in the graph, or, if it is desired that an access path exist between 2 nodes in a graph, these 2 nodes may be called end nodes.

In preferred embodiments, logical access paths may be derived or identified in this manner and an abstract graph representation of the SAN may be constructed. The connection and configuration state information from each of the devices may be used in an aggregated process to generate an abstract graph representation of the network representing the logical access paths in the SAN.

Each SAN device may be represented as a node in the graph. End-nodes represent applications/servers (source endpoints) and storage/data objects e.g. LUNs (target endpoints). In the first part of the abstract graph construction each edge between nodes represents an existing physical link between the SAN devices (or between a SAN device and a SAN end-points). In the next part of the constructions edges are eliminated in each case of a logical constraint, as defined in a device configuration, which disable flows on that link. The result of this iterative construction is an abstraction in which a logical access path between one application on a server and a data object e.g. LUN on a storage device exists if and only if a path exist in the abstract graph between the corresponding end nodes. An intermediate node is a node that is connected to two or more end nodes.

For the sake of process efficiency, the iterative step of graph edge elimination or pruning based on logical constraints implied by device configuration set-up is performed in a order designed to achieve as much pruning as early as possible. For that purpose SAN semantics are utilized to determine the order in which device constraints are considered. For example, a LUN masking constraints on one device which constraints most of the potential flows along the physical paths, may be used to prune the graph before a zoning constraint on another which restricts a smaller number of flows.

In certain embodiments, access path attributes are computed for each of the existing logical access paths according to the required attributes values specified in the logical access paths policy. The attribute values include, inter alia: level of end-to-end redundancy; type of redundancy; number of hops; and number of allocated ports.

These attributes values are computed based on the constructed abstract graph and the SAN device information in the following ways. The "level of end-to-end redundancy" attribute value is computed by determining the number of graph paths between the given end-points which are independent—that is do not traverse through any joint intermediate device, for example, whether each intermediate device is associated with different SAN fabrics. The algorithm used is an adaptation of known graph algorithms such as the BFS and Graph Coloring algorithms to this particular problem applied to reflect typical SAN topology characteristics for optimized execution time. The resulting algorithm is efficient and has a computational complexity of $O(N^2)$, where N is the number of components in the storage network environment.

In one aspect, the "number of hops" attribute of a logical access path is the number of intermediate nodes in the constructed abstract graph.

In another aspect, the "number of allocated ports" attribute for a given access path is determined from port allocation information obtained from the devices corresponding to the abstract graph.

As the storage network environment constantly undergoes changes, each change may affect any number of access paths and any of their end-to-end attributes, such access path analysis needs to be performed continuously to achieve appropriate storage service levels for applications at all times.

In an exemplary embodiment of FIG. 1, a zoning update on 122 may result in a new access path which enable a flow between A and another volume on 123 or on a different storage device. A failure of switch 121 may eliminate the access path between A and its volume, and disrupt the possibility of a corresponding data flow.

In certain practice, information is collected from the individual storage network environment components but no modules or agents are required to be executed on any of the hosts, and thus no direct interactions are required with any of the hosts. Such systems are referred to as agent-less since no modules or agents are required to be executed on any of the hosts.

In the exemplary environment depicted in FIG. 1, 100 depicts a storage management platform (SMP), and the end-to-end analysis of the access paths and attributes may be performed by the Global Analyzer module 105. Several component interaction modules (CIMs), modules 110, 111, 112, interact with a number of storage environment components and provide the Global Analyzer module with information filtered in a way which enables the Global Analyzer to perform the required end-to-end access path analysis continuously, but which limits the amount of information delivered to that Global Analyzer, thereby improving the efficiency and scalability of the method.

Each Component Interaction Module (CIM) 110, 111, or 112, is designated to interact with a sub-domain in the storage network environment consisting of one or more storage components $C_i$, where i is an index representing a component, such that the CIMS are connected to all the components in the environment. Each CIM periodically receives state updates from each of components $C_i$ designated to it. That state update may be in response to a request initiated by the CIM, or a polling request, or may be unsolicited update from $C_i$.

The state $S_N$ that may be sent in each update from $C_i$ to CIM includes the designated subset of the state of $C_i$, which includes all the state variables within the state $S_N$ that have been pre-selected, including, for example, the component identifiers (IDs) of other components currently connected to that component.

Each CIM has an internal state in which it stores information locally, that is, on the CIM itself. Each component $C_i$ has an internal state which may also be stored locally, that is, on the component $C_i$ itself. In certain practice, a hash function may be any function that maps an input value of any size to a unique output value which is much smaller in size, such that the probability of having the same function output for different function inputs is sufficiently low. Examples of such functions include CRC functions, SHA functions, or any other cryptographic one-way function.

In an exemplary embodiment, a hash function $F(.)$ may be pre-selected to have the following properties: for any input value or string X of any size, i.e., length, $Y=F(X)$, where Y is the output value or string, Y has a length which is significantly shorter than X. Furthermore, for any 2 different values X and X', let $Y=F(X)$ and $Y'=F(X')$, then with sufficiently high probability, Y is not equal to Y'.

Consequently, a hash function $F(.)$ may be used to determine if a state of a component $C_i$ has changed since the last update. for each state $S_N$ received at timestamp $T_N$, a CIM (110, 111, or 112 in FIG. 1) computes hash function value $F(S_N)$ and compares it to the most-recently locally-stored hash function value $F(S_N')$ which was computed for $C_i$ in the previous update. In certain practice, $S_N$ is the most-recently received state for and from component $C_i$, such that $F(S_N)$ is the most-recently computed hash function value for state $S_N$. In certain practice, $S_N'$ is the most-recently locally-stored hash function value for state $S_N$, although this value need not be stored locally. Locally-stored encompasses storage of the hash function value $F(S_N)$ on the component $C_i$ itself. If $F(S_N)$ is not equal $F(S_N')$ then with very high probability $S_N$ is not equal to $S_N'$—and so the state of the component $C_i$ has been changed. If on the other hand $F(S_N)=F(S_N')$, then with very high probability $S_N=S_N'$ and the state of component $C_i$ has not changed.

Note that since $F(S_N)$ is so much shorter than $S_N$ implies that by storing only $F(S_N)$ and comparing only $F(S_N)$ to previous $F(S_N')$ the CIM decreases the amount of space needed to store the hash function value $F(S_N')$ as well as the amount of time needed to process each update message from each component $C_i$.

Figure 2:
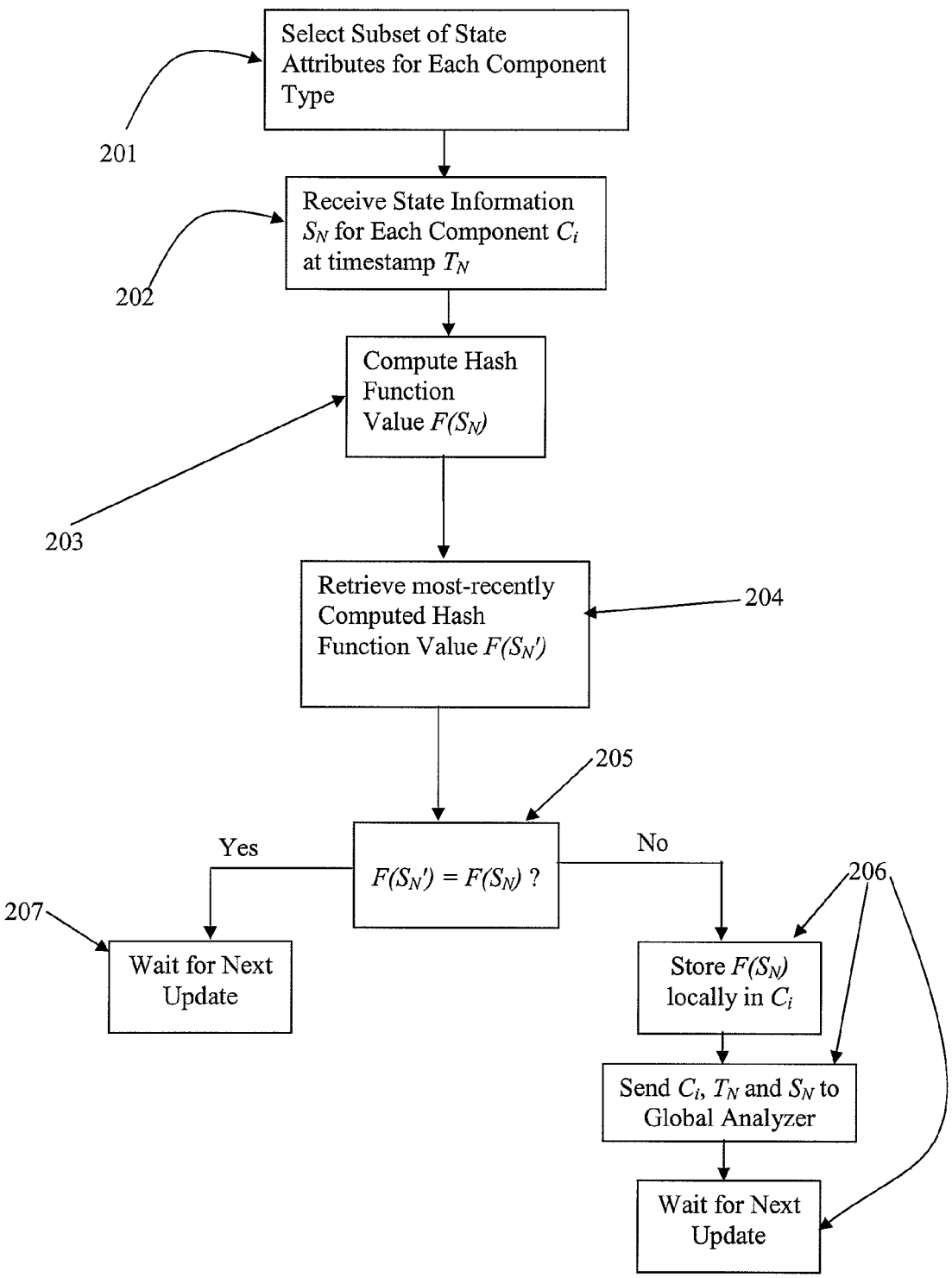
FIG. 2 is a simplified flow diagram for the process of discovering changes in the storage network environment.

In certain embodiments, each CIM performs a process that comprises the steps depicted in FIG. 2:

Step 201: selection for each type of component type the subset of state (or a state variable) to be tracked. That subset of states, i.e., a set of state variables, will include values for state variables which are selected by a combination of two main criteria:

the value of the selected state variable may have a direct impact on an application access path, or an application access path attribute, and so may directly affect the corresponding level of storage service to an application;

the value of the selected state variable is relatively stable—the value changes only as a result of significant configuration changes and not as a result of random traffic variations In an exemplary embodiment, in a switch component, a selected state variable may be the member of a zone, and in a storage device component a selected value may be the WWN associated with a LUN-masking. Each of these values may change and may cause access paths to be created, or to be terminated, or to change their access path attributes and so may directly affect the storage service levels of one or more applications.

These state variables may be expected to change only as a result of specific configuration changes, and so under normal circumstances may be expected to change relatively infrequently. In contrast, a subset of the state representing the actual level of data traffic flowing through particular ports on a switch, or through ports of a storage device, are expected to fluctuate quite rapidly, and so will normally not be selected.

In one aspect, a fluctuation threshold may be pre-selected such that only states which change relatively frequently are selected, while states that do change relatively frequently are not selected.

Step 202: Periodically, each CIM (110, 111, or 112 in FIG. 1) receives from each $C_i$ in its domain an update containing $[C_i, S_N, T_N]$. In this message $C_i$ represents the unique component identifier (ID) of the storage component, $S_N$ represents the set of values of the attributes selected in step 201, and $T_N$ represents the timestamp corresponding to the point in time at $C_i$ in which $S_N$ was generated.

Each update from each $C_i$ to the CIM (110, 111, or 112 in FIG. 1) may be generated either as a response to a request message from the CIM, i.e., by a polling request, or generated unilaterally by the $C_i$ either periodically or as a result of some internal event at the component, i.e., by an unsolicited update.

For example, an update message from a storage network switch may include the switch unique identifier as $C_i$, the status of all the zones and members defined at this switch at the point of the update generation, and $T_N$ include the time at the point of the update generation.

Step 203: For every update message $[C_i, S_N, T_N]$ CIM receives, CIM (110, 111, or 112 in FIG. 1) computes $Y=F(S_N)$.

Step 204: Use $C_i$ to look up $Y'=F(S_N')$, the computed hash function value of the state $S_N$ in the previous update.

Step 205: Check if Y equals $Y'=F(S_N')$.

For example, if $C_i$ is a storage network switch, and S includes all the zoning information associated with that switch, and there have been no zoning changes since the last update message, then $S_N$ will be equal to the previous state $S_N'$, and so the new computed value Y will also be equal to the previously computed and stored Y'. If there is no previously stored value Y' for $C_i$, possibly because $C_i$ may be a new component that has recently been added and so no previous state was received for it, then store $[C_i, S_N, T_N]$ and forward to Global Analyzer 105 of FIG. 1 the update message $[C_i, S_N, T_N]$.

Step 206: If Y is not equal to Y' then store $[C_i, S_N, T_N]$ and forward to Global Analyzer 105 of FIG. 1 the update message $[C_i, S_N, T_N]$.

If Y is not equal to Y' the specification of the function F(.) implies that with very high probability $S_N$ may be different than the $S_N'$ of the previous update, and so that there has been at one or more changes to the state since the last update from $C_i$. In such a case the new state may be passed on to the Global Analyzer 105 of FIG. 1 to determine which state or subset of states for component $C_i$ has been changed and what are the implications as far as access paths and service levels.

For example, if $C_i$ is a storage network switch a member may have been added to a zone on the switch, and so the new zone membership information will thus constitute a new different value for $S_N$ and so a new different value for Y. Such a change may be significant from the perspective of the Global Analyzer 105 of FIG. 1 because such an addition to a zone could imply that a new access path has been set up (which may or may not be consistent with the service level requirements of the corresponding applications). The updated state information is forwarded to the Global Analyzer 105 of FIG. 1 only if the associated timestamp $T_N$ of the update message represents a later time than the most-recently stored associated timestamp.

Step 207: If Y equals Y', then no update message is sent to the Global Analyzer. If no new update message is received from $C_i$ within an interval of time t after it was expected then send the Global Analyzer 105 of FIG. 1 an update message $[C_i,$ suspected down, TS], where TS is the timestamp representing the point in time in which this message was generated.

The above scheme may be more effective the lower the percentage of update messages to the CIM (110, 111, or 112 in FIG. 1) that get forwarded to the Global Analyzer. That is, the more stable the selected values constituting the respective S from the various components, the less they change between update messages, and the fewer the number of updates that are sent to the Global Analyzer. Conversely, any change, even a small one to any of the attributes value, require resending the whole of S to the global analyzer.

In another embodiment, $S_N$ may be split into segments $S_1, S_2, \ldots S_n$. The function F( ) is then used to compute and store the corresponding $Y_1, Y_2, \ldots, Y_n$. When each update message is arrived to the CIM (110, 111, or 112 in FIG. 1) from $C_i$ all the n respective values are computed, compared to the corresponding previous value and only these that have changed are forwarded to the Global Analyzer 105 of FIG. 1 in the following format:

$$[C_i, i, S_i, \ldots, S_j, j, TS] \quad (EQ. 1)$$

where $S_i$ and $S_j$ are the state segments that were determined by CIM to have changes after computing Yi and Yj, and where TS is the timestamp at which this information is forwarded to the Global Analyzer 105 of FIG. 1.

In another embodiment, the CIM (110, 111, or 112 in FIG. 1) may further compute $Z=F(Y_1, Y_2, \ldots Y_n)$ and store Z as well for future comparison. When the next update message is received, the CIM (110, 111, or 112 in FIG. 1) computes Z and compares it to Z' the previously stored value. Only if the values are different then a comparison of the individual $Y_1, Y_2, \ldots Y_n$ may be performed and the corresponding ones that have changes are forwarded to the Global Analyzer 105 of FIG. 1 as specified above.

In its interactions with storage network environments components each host may be identified by its storage network identifier such as for example the world-wide name (WWN) associated with any of its connected HBA storage network interface cards.

However in other interactions within the data center domain, network domain, or application management domain, a host may be identified by a different unique host-name identifier.

Figure 3:
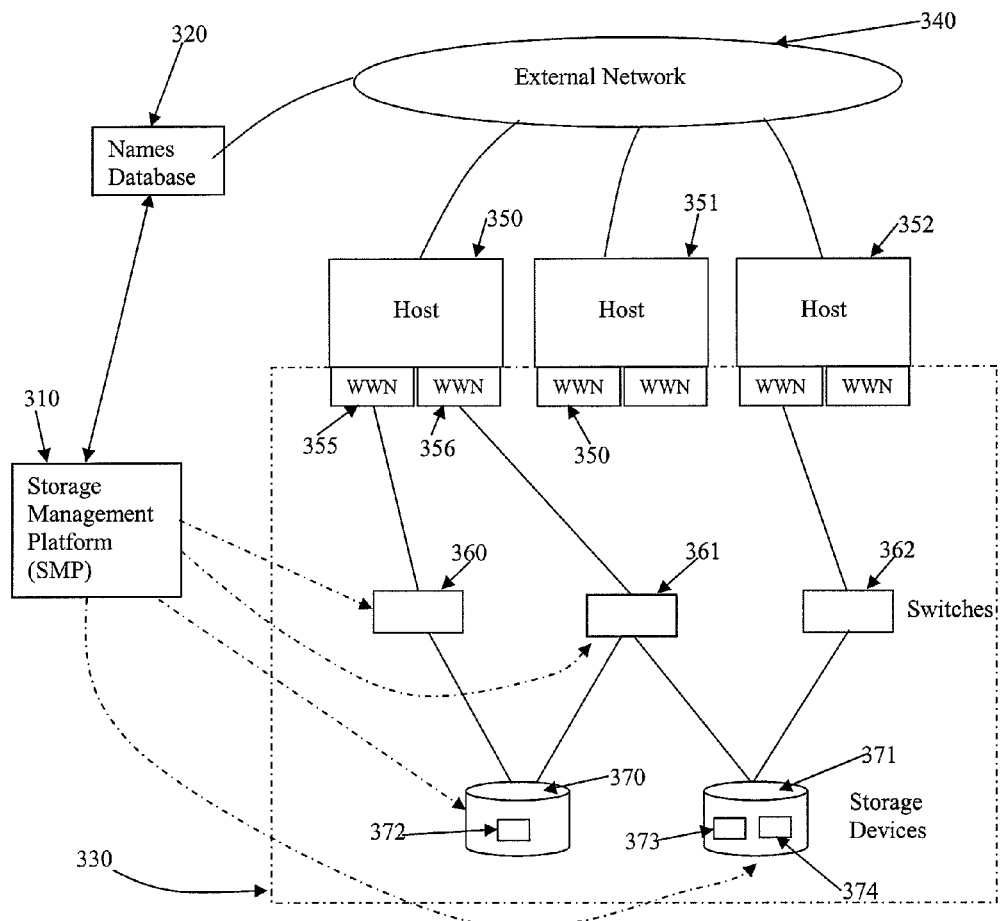
FIG. 3 depicts an exemplary storage network environment in which it is desirable to resolve the host names of components within the storage network.

FIG. 3 depicts an exemplary storage network environment. Host 350 interacts with storage networks components (e.g. switches 360 and 361) via 2 HBA cards 355 and 356 each with a designated WWN identifier. That host 350 is also connected to other external networks (such as for example internal or external IP networks such as 340) and may be identified in these environment by a different host name identifier.

FIG. 3 also depicts a Storage Management Platform (SMP) system (310) which may interact with the different components in the environment. This SMP corresponds to SMP 100 in FIG. 1. The SMP includes internally as sub-components, among others, the CIMS and Global Analyzer described above (110-112 and 105, respectively, in FIG. 1)

In certain embodiments, for a variety of management, control, and reporting tasks it may be desirable to establish the mapping between each host's storage network identifier and the host's name.

In certain embodiments, for efficiency and scalability reasons it may be desirable to perform that mapping automatically in environments that contain a large number of hosts and which are quite dynamic.

In an exemplary embodiment, the HBA cards and their corresponding WWNs may be occasionally swapped between hosts, and hosts may occasionally be migrated and re-connected to different storage network components.

In certain embodiments, because of manageability and scalability reasons it may be desirable to achieve that mapping without requiring any designated code or agents to be executing on the hosts, and without requiring any management interactions with the hosts themselves.

Figure 4:
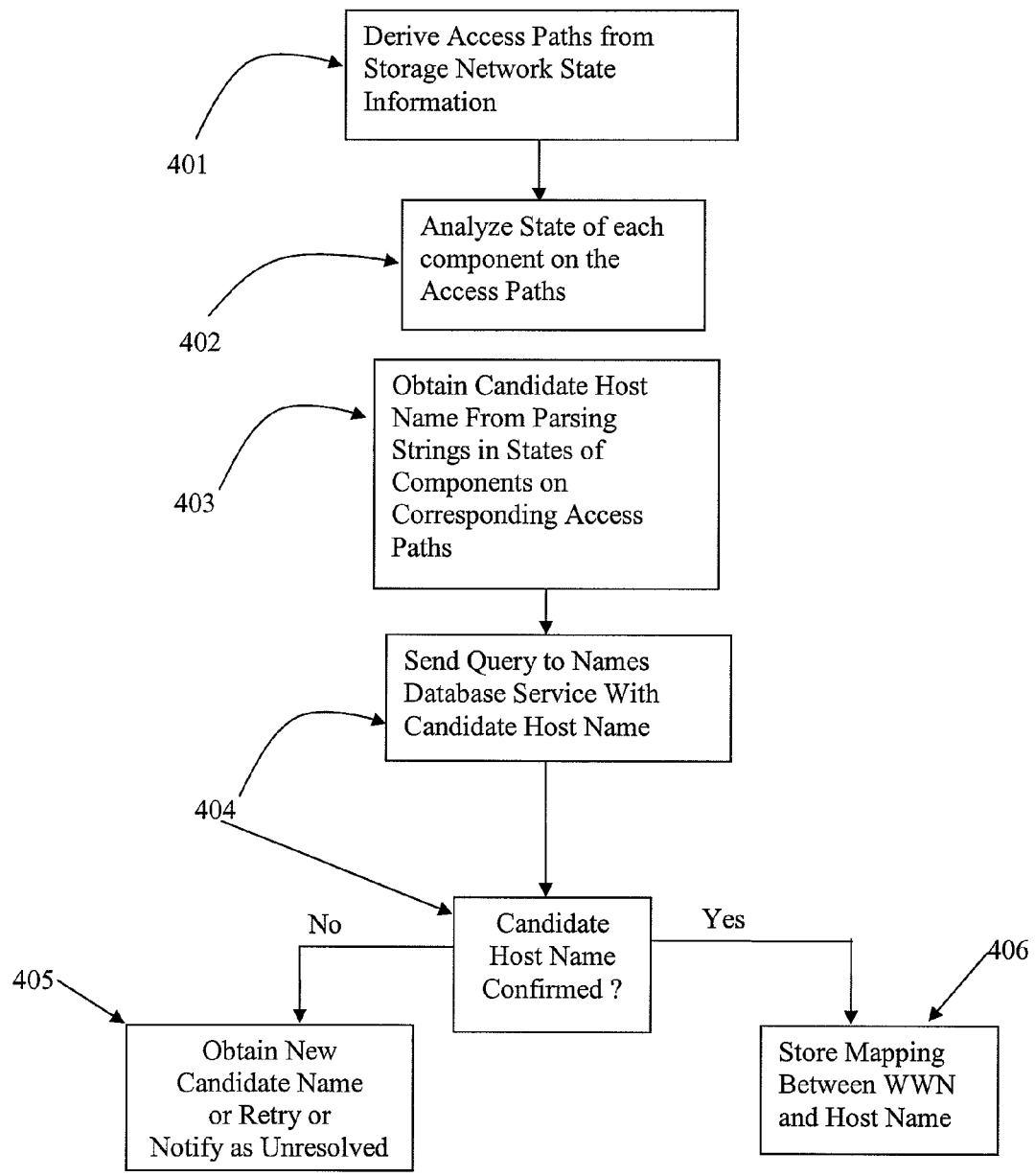
FIG. 4 is a simplified flow diagram for the process of resolving host names in the storage network environment.

In certain practice, no host agents are required, i.e., no designated code needs to be executed on the hosts, and thus the host name resolution may be based on management interactions only with the storage network components, as depicted in the flow chart in FIG. 4:

Step 401: Periodically, i.e. at discrete time intervals, the Storage Management Platform (SMP) receives from each component $C_i$ an update message containing its state $S_N$. All access paths and corresponding attributes are derived and updated internally by the SMP. Optionally, this information may be stored by the SMP.

For example, in FIG. 3 the SMP may derive the access path starting with host 350 and comprising of components 355, 360, and 370.

Step 402: For each derived access path which starts with a host associated with its storage network identifier (for example the WWN of its HBA), analyze the state $S_N$ for each component on that access path and determine the sub-state s of $S_N$ which may be associated with that access path. For example, host names are often embedded within corresponding switch zone names, or storage device LUN-masking for manageability reasons.

Step 403: For each sub-state, parse the strings to obtain a candidate host name or Host Candidate Name (HCN). Use methods based on regular expressions and other processing methods to derive the HCN. Rely on processing rules which represent best-practice methods and conventions for embedding the host name within certain parts of components states which are common in existing storage network environment. Potentially rely in specific external input on specific naming conventions used in a particular storage network environment.

In certain exemplary embodiments, a zone name convention may be to generate a zone name from a concatenation of a few fields such switch name, host name, and fabric name. The string processing may strip away the additional fields and derive the host candidate name from within the concatenation constituting the zone name.

Step 404: Send a query which include the HCN to a global name server, such as a Domain Name Server or DNS to determine if the HCN is included as a host name within that database.

Step 405: Receive a response from the global name server to the query with the HCN. If the response indicates that the HCN may not be recognized as a host name, then perform again step 403 to obtain another HCN' from sub-state s or from other state of components in that access path. Potentially perform again step 402 to obtain other HCNs from state of components in other access paths associated with the same host.

Step 406: If the response from the global name server (e.g. DNS) indicates that the HCN is recognized as a host name, then store internally the mapping between the host, its storage network environment identifier (e.g. WWN) and its host name (the confirmed HCN). Include that mapping in appropriate storage network environment reports. Optionally require additional external re-confirmation for the established mapping e.g. from an external network or user.

While the invention has been disclosed in connection with the embodiments shown and described in detail, various modifications and improvements may be made thereto without departing from the spirit and scope of the appended claims. By way of example, although the illustrative embodiments are depicted with reference to a storage area network (SAN), this need not be the case. Instead, other networks with defined access paths may employ the systems and methods described herein, and the network fabric may include any type of device that provides the described connectivity between network components. Accordingly, it will be understood by those skilled in the art that various changes in form and details may be made therein without departing from the scope encompassed by the appended claims.

What is claimed is:

1. A process for detecting state changes in storage network environments comprising:

receiving a value for one or more state variables, an associated timestamp, and a component identifier from each of a plurality of components in a storage network environment, each of the state variables associated with a topology of the storage area environment and having a rate of change below a fluctuation threshold, wherein the one or more state variables are selected from which other of the components is connected via each port, which zones are defined, one or more set transfer rates, or which of the components are members of a particular zone;

computing a hash function value of the received value for the one or more state variables for one of the components using a pre-selected hash function;

comparing the computed hash function value to a previously stored hash function value associated with the component identifier to determine whether the computed and previously stored hash function values are different; and storing the computed hash function value in place of the previously stored hash function value and as associated with the timestamp and the component identifier and performing end-to-end access path analysis of the components in the storage network environment, based at least on the value for the one or more state variables, to identify any access path changes, when the computed and previously stored hash function values are different.

2. The process of claim 1, wherein the pre-selected hash function maps an input value to a shorter output value and any two distinct input values map to two distinct output values.

3. The process of claim 1, wherein receiving the value for one or more state variables is the result of a response to a polling request or an unsolicited update.

4. The process of claim 1, further comprising comparing a previously stored timestamp with the received associated timestamp and only performing the end-to-end access path analysis when the previously stored timestamp is less than the received associated timestamp.

5. A storage management platform system comprising:
a global analyzer service module in communication with a plurality of component interaction modules, wherein the component interaction modules and global analyzer service module interact with a host and the component interaction modules are in communication with a plurality of components in a storage network environment and are each configured to execute instructions stored in a memory to:
receive a value for one or more state variables, an associated timestamp, and a component identifier from one or more of the components in the storage network environment, each of the state variables associated with a topology of the storage area environment and having a rate of change below a fluctuation threshold, wherein the one or more state variables are selected from which other of the components is connected via each port, which zones are defined, one or more set transfer rates, or which of the components are members of a particular zone;
compute a hash function value of the received value for the one or more state variables for one of the components using a pre-selected hash function;
compare the computed hash function value to a previously stored hash function value associated with the component identifier to determine whether the computed and previously stored hash function values are different; and
store the computed hash function value in place of the previously stored hash function value and as associated with the timestamp and the component identifier and send to the global analyzer service at least the one or more states, when the computed and previously stored hash function values are different; and
wherein the global analyzer service is configured perform end-to-end access path analysis of the components in the storage network environment, based at least on the value for the one or more state variables, to identify any access path changes.

6. The system of claim 5, wherein the pre-selected hash function maps an input value to a shorter output value and any two distinct input values map to two distinct output values.

7. The system of claim 5, wherein periodically receiving the one or more states is the result of a response to a polling request or an unsolicited update.

8. The system of claim 5, wherein the components in the storage network environment are each configured to compare a previously stored timestamp with the received associated timestamp and the global analyzer service module is only configured to perform the end-to-end access path analysis when the previously stored timestamp is less than the received associated timestamp.

\* \* \* \* \*